Dec. 9, 1941.                G. G. CRANE                2,265,895
                           CONTROL DEVICE
                         Filed July 3, 1939
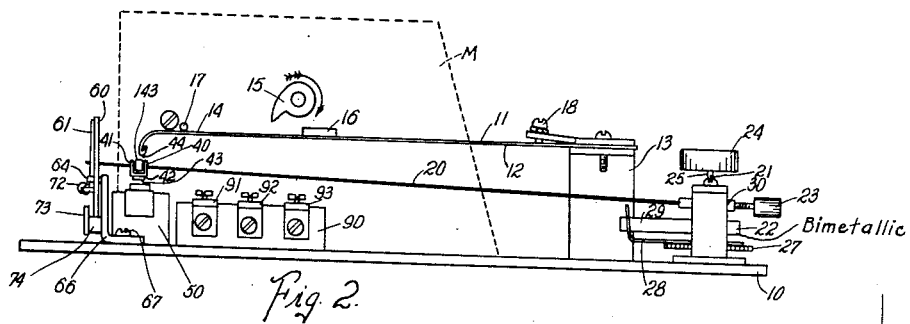
Fig. 2.
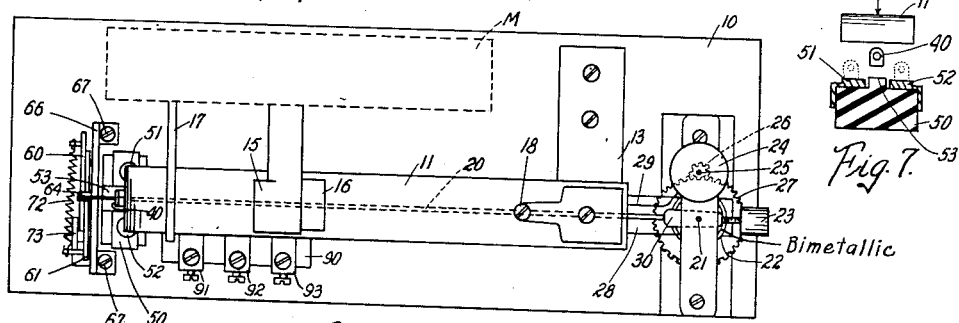
Fig. 3.
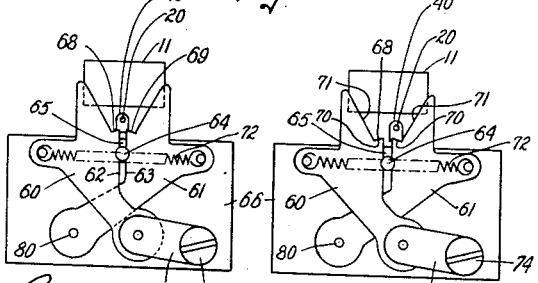
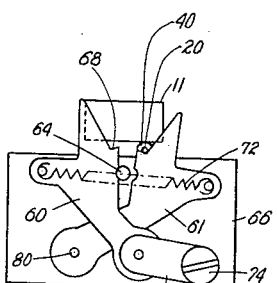
Fig. 4.   Fig. 5.   Fig. 6.
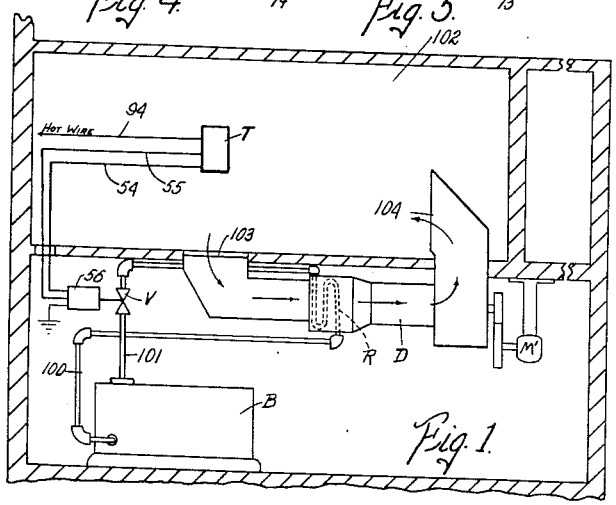
Fig. 1.
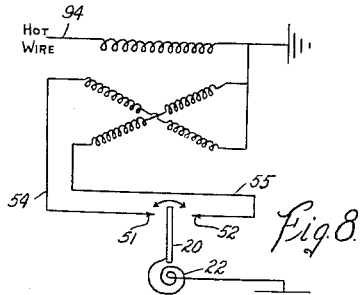
Fig. 8.
INVENTOR
Guy Gilman Crane
BY Frank Zugelter
ATTORNEY Patented Dec. 9, 1941

2,265,895

UNITED STATES PATENT OFFICE 2,265,895

CONTROL DEVICE

Guy Gilman Crane, Norwood, Ohio, assignor to Edwin J. Richard, Cincinnati, Ohio

Application July 3, 1939, Serial No. 282,643

14 Claims. (Cl. 200—56)

The present invention relates to control devices and more particularly to that general class of control devices which are responsive to temperature or pressure changes.

An object of the present invention is to provide a pressure or temperature responsive control device having means associated therewith for controlling any one of several electrical circuits, when the pressure or temperature varies from a predetermined pressure or temperature.

A further object of the invention is to provide a temperature or pressure responsive device which is more quickly sensitive to small temperature and pressure variations.

A further object of the invention is to provide a control device which may be simply and inexpensively made and which may be easily adapted for attachment to existing temperature or pressure responsive devices.

These and other objects are attained by the means described herein and disclosed in the accompanying drawing, in which:

Fig. 1 is a schematic view showing a typical blower type heating or cooling installation in connection with which a control device embodying the present invention is associated.

Fig. 2 is a side plan view of the device comprising the present invention.

Fig. 3 is a top plan view of the device shown in Fig. 2.

Figs. 4 to 6 inclusive are end views of a detail of the present invention disclosing various operative positions.

Fig. 7 is an end view of a detail of the invention.

Fig. 8 is a wiring diagram illustrating how the device comprising the invention may be utilized as a room control for a so-called blast heating system, such as schematically shown in Fig. 1.

For the purpose of example only, the device comprising the present invention will be described as a themostatic control member for use with a so-called blast heating or cooling system. As clearly shown in Fig. 1, a typical blast heating or cooling system may comprise a suitable source of heating media, such as boiler B including suitable inlet and outlet conduits such as 100 and 101. A suitable heat exchange device, such as a radiator R is suitably connected to boiler B, as shown.

The space or room to be heated, 102, may be provided with a suitable air circulating means which may comprise an air duct D, having an air intake end 103 and an air discharge or outlet end, 104. Air is caused to circulate, as indicated by the arrows, through duct D, under the influence of a suitable fan, not shown, which may be driven by means of a suitable motor M, as shown.

Radiator R may be interposed within and intermediate the length of air duct D as shown, whereby the temperature of the air circulated through said duct and discharged into room 102 will be controlled as it passes over and through suitable grids of said heat transfer device or radiator R.

A thermostat T, made in accordance with the teachings of the present invention may be located within room 102 as shown. Said thermostat may be adapted to selectively close certain electrical circuits to a suitable motor such as 56 which is adapted to operate a suitable valve V located in the radiator inlet conduit 101, as shown. By opening or closing valve V to a greater or lesser degree the quantity of heating media delivered to radiator R may be accurately controlled.

Thermostatic devices heretofore used to control the amount of heating media delivered to a room or space to be heated or cooled, have been characterized by the objectionable feature known as hunting, to those skilled in the art.

In order to lessen hunting and to improve the sensitivity of such thermostatic devices it has been customary to provide control means of the general type which comprises a floating or movable finger or contact arm which is periodically moved by means of a beater arm into engagement with one of two spaced contacts which were electrically connected to suitable valve control devices located remotely therefrom. It has likewise been the practice to move such a movable contact arm into vertical alignment with one or the other of said spaced contacts by means of a suitable temperature or pressure responsive device, such as a bimetallic thermo unit or a Bourdon (gauge) tube.

In order to increase the sensitivity of such devices they have been constructed with a triangular wedge like member or cone for deflecting the movable contact arm to one side or the other of said wedge or cone to bias said contact arm toward one or the other of the spaced contacts when the contact arm is biased to one side or the other of the apex of said wedge or cone. However such control devices have not been entirely satisfactory because they are still subject to hunting, hereinabove referred to.

The present invention is, among other things, directed to the provision of a simple, inexpensive means to move a floating contact arm, in response to an impulse from a beater arm, either into a neutral, or non-contact making position, or toward one or the other of two spaced contacts when said movable arm is biased the slightest degree from its neutral position, whereby the sensitivity of the device is increased and the objectionable "hunting" action hereinabove discussed is positively eliminated.

The present device comprises, generally speaking, three main elements or subdivisions, namely: a beater arm and means for periodically deflecting it; means for swinging or moving a contact arm in response to changes in external conditions of temperature or pressure; and means to guide said contact arm to engage one or the other of two spaced contacts when said arm is deflected while biased from a so-called neutral position, and including means to preclude said contact arm from being deflected toward either contact when said arm is in a neutral position.

As clearly shown in Figs. 2 and 3 the three elements hereinabove named may be mounted or grouped upon a suitable common base, such as 10.

A beater arm 11 may comprise a suitable strip 12 of material such as spring steel (or the like) one end of which is fixed relative to base 10 by securing one end of said strip to a suitable bracket such as 13, as clearly disclosed in Figs. 2 and 3. The free end 14 of said strip is adapted to be freely flexed about its fixed end.

The outer end 14 of beater arm 11 may be periodically lowered by any suitable means, such as by a cam 15 which is adapted to be rotated at a constant rate by any suitable means such as a synchronous motor M, indicated by broken lines. If desired a contact plate 16 with which cam face 15 may engage may be secured to the upper side of beater arm 11, as shown.

A suitable pin, such as 17, may be provided for limiting the uppermost or normal position which said beater arm will assume (Fig. 2). If desired suitable means such as set screw 18 may be provided for controlling the operating characteristics of said beater arm by permitting regulation of the tension of said arm.

From the foregoing it is apparent that for each revolution of cam 15 the free end of beater arm 11 will be deflected downwardly by an amount proportional to the effective length of the cam throw.

A movable contact arm 20 is adapted to be swung in a horizontal plane about the axis of a suitable shaft 21 to which it is anchored by means of a suitable sleeve 30. Shaft 21 is adapted to be turned about its longitudinal axis in response to temperature changes as translated into mechanical movements by means under the control of external conditions, such as, by way of example thermo unit comprising a bimetallic strip 22 coiled about shaft 21. The inner end of the coil may be suitably secured to shaft 21, whereas the other, outer or free end 29 of the coil may be fixed relative to a stop member 28 which may be secured to and carried by a gear wheel 27 mounted for free rotation about shaft 21. The outer end 29 of the coil may be shifted relative to its inner end for effecting a so-called neutral setting of contact arm 20, by rotating stop member 28 about shaft 21. Such adjustment may be expeditiously accomplished by means of hand knob 24 which is carried by the upper end of a rotatable shaft 25 to the lower end of which shaft is secured spur gear 26, whose teeth make driving contact with the teeth of gear wheel 27. This arrangement makes it but a simple matter to control, set or preselect the deflection of contact arm 20 for any given temperature whereby said arm may be adjusted to establish a so-called "neutral position" as hereinafter more fully explained. A weight 23 may be provided on the rear end of sleeve 30, as shown for counterbalancing the weight of contact arm 20.

In the preferred embodiment of the invention a contact member 40 is provided intermediate the length of movable contact arm 20. Said contact member may comprise a U-shaped member comprising spaced side walls 41 and a bottom 42. A roller member 143 suitably mounted for rotation about movable arm 20 is provided intermediate walls 41, as shown. Walls 41 may be secured to swinging arm 20 in any suitable manner so as to insure a good electrical connection therewith. A suitable contact face 43, of a suitable arc resistant material, such as platinum or the like may be provided on the lower face of bottom 42, as shown.

Roller 143 is adapted to be contacted by the free end 14 of beater arm 11. If desired, the end of said arm may be bent downwardly and then back upon itself in order to provide a suitable roller contacting surface or face 44, as shown.

It is apparent that each time beater arm 11 is deflected downwardly by the action of cam 15 the outer end of swinging contact arm 20 will likewise be deflected downwardly.

A suitable contact block 50, preferably of insulating material, is provided having suitable contacts 51 and 52 provided on its upper surface. Said contacts may be physically spaced or separated by a raised lip 53 formed integrally from said contact block. Raised lip 53 comprises what will be hereinafter referred to as the neutral area 53 of contact block 50.

Each contact 51 and 52 may be connected by suitable conductors such as 54 and 55 (Fig. 8) to suitable windings of a remotely located reversible motor 56 such as may be used to control valve V (Fig. 1) of the heating or cooling system as hereinabove described. It should here be noted that base 10, and contact arm 20 are grounded in the electrical circuit disclosed herein.

As clearly shown in Figs. 2, 3, and 7 contact member 40 is adapted to engage, when deflected downwardly by beater arm 11, ether the neutral area 53 or one or the other of the two contacts 51 and 52. By way of example, it may be hereinafter be assumed that the neutral position of the movable contact arm is set for a 70° temperature and that said contact arm will swing toward contact 51 when the temperature is less than 70° and towards contact 52 when the temperature is in excess of 70°.

Under these assumed facts contact point 51 is connected via conductor 54 to the forward drive coil of motor 56 which when energized will drive said motor to open the valve V. Likewise contact point 52 is connected via conductor 55 to the reverse coil of said motor which, when energized, will close valve V.

A pair of independently displaceable wedge-like members 60 and 61 are provided adjacent the outer free end of movable contact arm 20, as shown. These wedge-like members are adapted to be displaced by and guide contact arm and associated contact member 40, in response to an impulse from beater arm 11, to engage one or the other of spaced contacts 51 and 52 when contact arm 20 is biased to either side of the neutral position indicated in Figs. 3, 4 and 7 in response to temperature changes in excess of or less than 70°.

Each wedge-like member 60 and 61 includes an opposed vertical face 62 and 63 respectively which are normally spaced apart as shown in Figs. 4 and 5 by means of a suitable stop member 64. The lateral distance between opposed faces 62 and 63 defines an area which hereinafter will be referred to as neutral passage 65.

The upper portion of wedge members 60 and 61 are adapted to be forced or swung away from pin 64 about their lower ends which are pivotally secured relative to a suitable upstanding bracket such as 66 (Fig. 2). Said bracket may be anchored to base plate 10, by any suitable means, such as screws 67. Stop member 64 may also be anchored to bracket 66, as shown.

Each wedge-like member 60 and 61 may be provided with suitable contact arm receiving V-shaped notches 68 and 69 respectively, each notch comprising a lower face 70 inclined downwardly away from neutral passage 65, and an upwardly inclined face 71, as clearly shown.

The upper portions of said wedge-like members are yieldingly urged, by a suitable spring 72, towards each other whereby to contact stop member 64, as shown.

Linkage member 73 as disclosed in Figs. 2–6 inclusive, is provided merely for the purpose of spacing the lower end of wedge member 60 from bracket member 66 so as to clear the lower end of wedge member 61. Said linkage member may be suitably secured to bracket 66 by means of a screw 74, or the like.

The parts hereinabove described are adapted to cooperate with moving contact arm 20 in the following manner:

During those periods of the time when the room temperature equals the predetermined temperature for which the thermostat was set, viz. 70°, moving contact arm 20 will assume a neutral position in vertical alignment with neutral passageway 65 (Fig. 4), and contact member 40 will be in vertical alignment with neutral area 53 of contact block 50 (Fig. 7). When arm 20 is deflected downwardly by beater arm 11 it will enter neutral pasageway 65 and contact member 40 will engage neutral area 53, and no electrical circuit will be affected.

In the event that the room temperature should exceed 70° contact arm 20 will be biased to the right of its neutral position (Fig. 5) under the influence of thermo unit 22, whereby movable contact-arm 20 is in vertical alignment with contact arm receiving notch 69.

When beater arm 11 is lowered in response to an impulse from cam 15, contact arm 20 will be moved vertically downward whereby to engage with notch 69. Further downward movement of contact arm 20 will cause the upper portion of wedge member 61 to be swung to the right about its pivot 80 whereby contact member 40 will be guided downwardly and to the right along the arc of a great circle having its center at pivot 80 whereby to make a wipe contact with contact 52 (Figs. 6 and 7) for the duration of the beater impulse.

It should be observed that roller 143 permits free relative movement between face 44 of beater arm 11 and contact member 40 when contact arm 20 is simultaneously depressed and laterally shifted as just explained.

The contact arm 20, beater arm 11 and wedge member 61 will assume their relative positions shown in Fig. 5 upon the termination of the impulse. In the event that movable contact arm 20 remains biased to the right of its neutral position the operation just described will be repeated and contact member 40 will again engage contact 52 whereby the circuit to the reverse coil of motor 56 will be again energized for the duration of the impulse, and valve V will be further closed.

It should be observed that when valve V has thus been properly adjusted so as to permit just the proper amount of heating media to pass through radiator R to satisfy the heat demand in room 102, said valve will be maintained in its adjusted condition until such a time when more or less heat is required in the space being heated or cooled. This is the case since moving contact arm 20 will assume a neutral position as soon as and so long as the predetermined room temperature which corresponds to the present neutral position of the movable contact arm, is reached and maintained.

By reason of neutral passageway 65 between opposed wedge faces 62 and 63 the heat media flow control means are not actuated during those periods of time when the heat demand of the room is satisfied. However as soon as contact arm 20 is deviated the least amount on either side of the neutral, 70°, position, one or the other of the electrical circuits to motor 56 will be closed during the impulse period of beater arm 11.

It should be understood that if desired the thermo unit 22 may be replaced by a pressure responsive device such as a Bourdon tube, in which event the device would operate in response to pressures greater than or less than a predetermined pressure which would comprise the neutral position or setting for contact arm 20.

It should be understood that any temperature other than 70° may be preselected as the temperature at which movable arm 20 will be in a neutral, non-contact making position, by merely manipulating control knob 24.

It should likewise be understood that the device herein disclosed may be adapted to many uses other than to the use described herein.

It should also be appreciated that the device may be easily, quickly and inexpensively adapted to cooperate with many pressure or temperature control devices now in use whereby their sensitivity and selectivity will be greatly enhanced and hunting eliminated.

By reason of the neutral area or passageway 65 provided between wedges 60 and 61, the number of times valve V is actuated for any given period is less than it would be were said neutral area not provided, although the sensitivity control has not been impaired.

Suitable electrical connections may be made with motor conductors 54 and 55 by means of suitable terminals such as 91, 92 and 93, which may be mounted on a suitable insulated connector block such as 90, as shown in Figs. 2 and 3.

If desired, hot wire 94 may be connected to terminal 91 which may be electrically connected to contact arm 20 by any suitable means, not shown. Contacts 51 and 52 may be electrically connected to terminals 92 and 93 respectively by suitable conductors, not shown. However, it should be understood that other electrical systems may be substituted for the exemplary circuit herein disclosed.

It should be noted that in those instances where the device is used to control a refrigerant boiler B and radiator R would be replaced by a compressor and evaporator unit respectively, whereby air circulated through duct D would be chilled rather than heated.

What is claimed is:

1. In a device of the class described comprising a bimetallic thermo unit, a contact arm biased by said thermo unit, means including a beater arm operatively associated with said contact arm for imparting a periodic contact closing movement thereto, a contact member carried by said contact arm, a pair of spaced contact points separated by a neutral, non-conducting area, displaceable contact arm guiding means disposed adjacent said contact arm for guiding said contact arm so that said contact member will engage one or the other of the two spaced contact points when said contact arm is moved along a predetermined path to a contact closing position while biased from a neutral position located midway between said contact points.

2. In a device of the class described comprising a swinging contact arm, externally operated control means operatively associated with said arm for biasing said arm to one side or the other of a predetermined neutral position, a contact member carried by said swinging contact arm, spaced contact points, beater means for periodically deflecting said contact member to a contact point engaging condition, and displaceable contact arm guiding means engageable by said contact arm for guiding said contact member along a predetermined path toward one or the other of said contact points when said contact arm is deflected while biased from its predetermined, neutral position.

3. In a device of the class described for selectively closing none or one or the other of two electrical circuits, comprising a movable contact arm, a contact member carried by said arm, means for biasing said arm about a neutral position, a contact block including spaced contact points located in a plane spaced from and parallel to the plane of contact arm movement, means for periodically deflecting said movable contact arm to cause said contact member to engage said contact points, and means for shifting said contact member to engage one or the other of said contact points when said contact arm is biased from said neutral position, said last mentioned means comprising a pair of wedge-like members disposed on opposite sides of the contact-arm neutral position each including a contact arm engaging notch, adjacent portions of said wedge-like members being physically separated by a neutral passageway, said contact arm adapted to be received in said neutral passageway when said movable contact arm is deflected while in a neutral position, whereby said contact member will engage said contact block intermediate said spaced contact points.

4. In a control device comprising contact making means, a movable arm associated with said contact making means and controllable by an external condition, a pair of opposed, pivotally mounted wedge members each including a V-shaped notch adapted to be selectively engaged by said movable arm, a passageway extending vertically between adjacent edges of opposed wedge members adapted to receive said movable arm, and means to periodically depress said movable arm to enter said passageway or to engage one or the other of the two wedge members, dependent upon the external conditions, to selectively actuate the contact making means.

5. In a control device, comprising a base, a contact making means, a movable contact arm associated with said contact making means and controlled by an external condition, a contact block including a pair of spaced contact points mounted on said base, a pair of pivotally mounted wedge members carried by said base each including a V-shaped notch adapted to engage the outer end of said movable arm, a neutral passageway intermediate adjacent portions of said wedge members adapted to receive the outer end of said movable arm when said arm is in a neutral position intermediate said spaced contact points, and means to periodically depress said movable arm to enter said neutral passageway or to engage the V-shaped notch of one or the other of said wedge members to selectively actuate said contact making means.

6. A control device for selectively closing circuits to a power consuming device comprising contact making means having three possible positions, a pair of spaced contacts separated by a neutral contact area defining the three possible contact positions, each of the spaced contacts being electrically connected to a power consuming device circuit, a movable contact arm adapted to selectively engage any one of the three contact positions, said contact arm being under the control of external conditions, a pair of spaced wedge members, each including a contact arm receptive V-shaped notch, pivotally mounted adjacent the outer end of said movable contact arm, a contact arm receptive passageway disposed intermediate said wedge members, means to periodically depress said movable contact arm to a contact engaging position, said movable contact arm adapted to engage one or the other of said wedge members when said arm is biased to either side of a neutral position to make a wipe contact with one of said spaced contacts, said movable contact arm adapted to be received within said passageway whereby to engage the neutral contact area when moved to a contact engaging position while in a neutral position.

7. In a control device comprising in combination a movable contact arm including a contact member, means under the control of external conditions for biasing said arm to one side or the other of a neutral non-contact making position, a pair of spaced contacts engageable by said contact member, said contacts being located on opposite sides of said neutral position, of displaceable guiding means engagable by said contact arm and shifted thereby, for guiding said contact arm onto a contact member when said contact arm is biased from its neutral position, and means for periodically deflecting said contact arm to actuate said contact making means.

8. As a new article of manufacture a selective contact closing device for shifting a contact arm toward one or the other of two spaced contacts when said arm is biased from a neutral position located intermediate said spaced contacts, comprising an upstanding plate, a pair of levers, each lever comprising a lower portion and an upper portion, the lower portion of each lever being pivotally secured to said plate on opposite sides of a vertical axis in vertical alignment with said neutral position, the upper portion of each lever being disposed on an opposite side of said vertical axis relative to its lower portion, a stop member secured to said plate and disposed on said vertical axis, means for yieldingly urging the upper portions of said levers toward one another to contact said stop member, the upper portion of each lever comprising a vertical face adapted to contact opposite sides of said stop member, the upper portion of each vertical face terminating in a contact arm receiving member, the upper portion of each lever adapted to be swung downwardly and away from said stop member about its pivoted lower portion toward one of said contacts in response to a downwardly directed force applied to said lever by said contact arm, the lateral distance between adjacent vertical faces above said stop member comprising an unobstructed neutral passage adapted to receive and maintain said contact arm in a neutral, non-contact making condition.

9. In a device of the class described, a condition-responsive element, a member secured thereto, said condition responsive element adapted to bias said member to one side or the other of a predetermined neutral position, a contact element carried by and secured to said member, contact points engageable by said contact element, means for periodically moving said contact element into and out of contact with said contact points, and displaceable means engageable by said member for directing said contact element along a circle arc to make contact with one of said contact points during a contact period when said member is biased from a neutral position.

10. In a device of the class described, a condition-responsive element, an arm secured thereto, a contact element carried by and secured to said arm and adapted to be biased to one side or the other of a neutral position depending upon the position of said condition-responsive element, a pair of contact points disposed one on each side of said neutral position, said contact points being engageable by said contact element, means for periodically moving said contact element into and out of contact position relative to said contact points, and displaceable means selectively engageable by said arm for directing said contact element along a predetermined path to squarely engage one or the other of said contact points when said arm has been biased from a neutral position.

11. In a device of the class described comprising a swinging contact arm, externally operated control means operatively associated with said arm for biasing said arm to one side or the other of a predetermined neutral position, a contact member carried by said swinging contact arm, a pair of spaced contact points, a pair of displaceable means selectively engageable and displaceable by said contact arm for guiding said contact member along a predetermined path to make contact with one or the other of said contact points when said contact arm is deflected while biased from its neutral position, and means for periodically deflecting said contact arm.

12. In a control device comprising a movable contact arm, a contact member carried by said arm, means responsive to external conditions for biasing said arm relative to a predetermined neutral position, spaced contact points located in a plane spaced from the plane of contact arm movement, a pair of opposed pivotally mounted independently displaceable direction guides adapted to be selectively engaged and actuated by said contact arm for guiding said arm along a predetermined path to make a contact between said contact member and one or the other of said contact points when said arm is biased from a predetermined neutral position, a contact arm receptive passageway provided between said guides, and means for periodically depressing said arm to enter said passageway or engage one or the other of said guides, dependent upon the external conditions.

13. A control device for selectively closing circuits to a power consuming device comprising contact making means having three possible positions, a pair of spaced contacts separated by a neutral contact area defining the three possible contact positions, each of the spaced contacts being electrically connected to a power consuming device circuit, a movable contact arm adapted to selectively engage any one of the three contact positions, said contact arm being under the control of external conditions, a pair of pivotally mounted, displaceable direction guides, each adapted to guide said contact member onto one of said spaced contacts and to make contact therewith when engaged by said contact arm, means to periodically depress said movable contact arm to a contact engaging position, said movable contact arm when biased from the neutral contact position adapted to engage and actuate one or the other of said displaceable guides which are adapted to guide said contact member along a predetermined path to make contact with one of said spaced contacts.

14. In a control device comprising contact making means, a movable arm associated with said contact making means and controllable by an external condition, a pair of spaced contact points, a pair of pivotally mounted displaceable direction guides adapted to guide the contact member along a predetermined path to make contact with one or the other of said contact points when said movable arm is deflected to engage said guides, and means for periodically deflecting said movable arm.

GUY GILMAN CRANE.